United States Patent Office 3,530,101
Patented Sept. 22, 1970

3,530,101
PROCESS FOR PREPARATION OF ALKYL HALF ESTERS OF MALEIC ANHYDRIDE COPOLYMERS
Richard T. Haynes and Riley N. Weston, St. Louis, Mo., assignors to Monsanto Company, St. Louis, Mo., a corporation of Delaware
No Drawing. Filed June 17, 1968, Ser. No. 737,348
Int. Cl. C08f 27/12
U.S. Cl. 260—78.5
9 Claims

ABSTRACT OF THE DISCLOSURE

In preparing alkyl half esters of alkyl vinyl ether—or olefin—maleic anhydride copolymers by reaction of primary or secondary alcohols containing 1 to 8 carbon atoms with the copolymer, the reaction is conducted in the presence of isopropanol under superatmospheric pressure at a temperature at least 2° C. above the atmospheric boiling point of the reaction mixture. Preferably, the reaction mixture comprises about 1 molecular proportion of the reacting alcohol and about 1 molecular proportion of isopropanol per maleic anhydride group. The half ester product is suitable for a variety of applications including use as a holding film in hair spray formulations.

BACKGROUND OF THE INVENTION

This invention relates to improved methods of preparing alkyl half esters of maleic anhydride copolymers. In particular, the invention is related to the preparation of such products wherein the alkyl substituent contains from 1 to 8 carbon atoms and wherein the maleic anhydride copolymer is a copolymer of maleic anhydride with an olefin containing from 1 to 4 carbon atoms or an alkyl vinyl ether wherein the alkyl group contains from 1 to 3 carbon atoms.

Half ester compounds of the foregoing type are resinous products which are used for such purposes as film forming ingredients in hair spray compositions, and coatings for pharmaceutical preparations. Such compounds are prepared by esterification of the copolymer with an alcohol. The resinous products are glassy solids which generally must be dissolved in an appropriate solvent such as ethanol or isopropanol for use. However, dissolution of the solid is sometimes quite difficult, requiring prolonged and vigorous agitation. Further, the solid product is often contaminated with occluded reactants.

Product contamination with certain alcohol reactants, such as butanol, is particularly detrimental since the toxicity or objectionable odor of the alcohol may render the product unsuitable for its intended use.

It is apparent that a process which is capable of providing the product in readily soluble form and free from substantial contamination with initial reactants would represent a significant advancement in the art.

SUMMARY OF THE INVENTION

It is an object of this invention to provide a process of preparing half esters of the type described above in the form of a readily soluble product rather than as a glassy solid. A further object of the invention is to provide an improved process which is capable of providing a product substantially free of contamination with original reactants. Still another object is to provide improved processes wherein the esterification of the maleic anhydride copolymer is rapidly accomplished.

Basically, these and other objects are attained by conducting the reaction of the maleic anhydride copolymer and the reactant alcohol in the presence of isopropanol under superatmospheric pressure and at elevated temperatures. The invention will be better understood from the following description of the preferred embodiments.

DESCRIPTION OF THE PREFERRED EMBODIMENTS

The products prepared by the process of this invention are alkyl half esters of maleic anhydride copolymers, wherein the alkyl substituent contains from 1 to 8 carbon atoms.

The reactants utilized to produce these products are maleic anhydride copolymers and primary or secondary alcohols as hereinafter set forth.

The maleic anhydride copolymer can be a copolymer of maleic anhydride with an olefin containing 2 to 4 carbon atoms or with an alkyl vinyl ether having 1 to 3 carbon atoms in the alkyl substituent. Examples of olefin-maleic anhydride copolymers include ethylene-maleic anhydride, propylene-maleic anhydride, butylene-maleic anhydride, isopropylene-maleic anhydride, and isobutylene-maleic anhydride copolymers. Examples of the alkyl vinyl ether-maleic anhydride copolymers include methyl vinyl ether-maleic anhydride, ethyl vinyl ether-maleic anhydride, propyl vinyl ether-maleic anhydride, and isopropyl vinyl ether-maleic anhydride copolymers.

The alcohols suitable for use in the esterification reaction are linear primary alcohols containing from 1 to 8 carbon atoms, for example, 1-butanol; primary alcohols containing 5 to 8 carbon atoms and having the formula

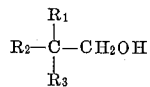

wherein $R_1$ and $R_2$ are each hydrogen or alkyl, $R_3$ is alkyl, $R_3$ being branched when both $R_1$ and $R_2$ are hydrogen, and at least 2 of $R_1$, $R_2$ and $R_3$ each containing at least 2 carbon atoms when $R_1$, $R_2$ and $R_3$ are all alkyl for example, 2-ethyl-1 hexanol, 1,4-dimethyl-1 butanol, and 2-ethyl, 2 methyl-1 pentanol; linear secondary alcohols containing 6 to 8 carbon atoms, for example, 2 or 3 hexanol, and 2,3 or 4 heptanol or octanol; and secondary alcohols containing from 6 to 8 carbon atoms and having the formula

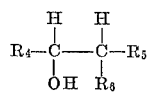

wherein $R_4$ is a linear alkyl group, $R_5$ is hydrogen or ethyl, $R_6$ is a linear alkyl group containing at least 2 carbon atoms when $R_5$ is ethyl and is a branched chain alkyl group when $R_5$ is hydrogen, for example, 4-methyl-2-pentanol, 3-ethyl-2-pentanol and 2,2 dimethyl-2-hexanol.

It is preferred that the reaction mixture comprise about 1 molecular proportion of reactant alcohol per maleic anhydride group. The use of such proportions favors production of products which are substantially free of contamination by the original reactants. No more than about 1.1 molecular proportions of reactant alcohol per maleic anhydride group should be present. The use of higher proportions is undesirable due to problems of toxicity and/or objectionable odor associated with the unreacted alcohol. Absence of unreacted alcohol in the product can be ensured by reducing the molecular proportion of alcohol per maleic anhydride group to as low as 0.5:1; however, this is not generally necessary.

To obtain a viscous half ester product which is readily soluble in ethanol or isopropanol and substantially free from occluded reactants, the reaction is conducted in the presence of isopropanol. The use of isopropanol is a specific and critical requirement of this invention. When other diluents are substituted for isopropanol, they are found to react with the copolymer to form undesired half esters or to be undesirable with respect to odor characteristics or inoperable in that they do not sufficiently solvate the desired half ester product.

The reaction mixture will contain 0.5 to 2.0 molecular proportions, preferably about 1 molecular proportion of isopropanol per maleic anhydride group. Lower proportions of isopropanol do not sufficiently solvate the half ester products and higher proportions tend to reduce the rate of the esterification reaction.

The reaction is conducted under a pressure sufficiently high to permit attainment of a temperature at least 2° above the boiling point of the reaction medium at atmospheric pressure. Preferably, a temperature of at least 100° is utilized. The reaction medium can boil under reflux or can be subjected to higher pressures to prevent boiling. Adequate pressure can be provided by the vapor pressure of the reaction medium in a sealed system or preferably, the reaction vessel can be pressurized with an inert gas such as nitrogen, helium, argon, carbon dioxide, or the like. The term inert is used to include gases inert in the reaction system and is not limited to gases inert per se.

Although little advantage is obtained by the use of temperatures more than 15 to 20° above the atmospheric boiling point of the reaction mixture, higher temperatures can be utilized if desired. The maximum temperature utilized will be below the temperature where product degradation as evidenced by product having a color darker than 5 Gardner units as determined by comparison of a 50% by weight ethanol solution with 1933 Gardner color standards (see Table II ASTM, D803) occurs.

The use of temperatures and pressures as discussed above is considered necessary for the satisfactory practice of this invention. It is noted that the esterification reaction in some instances does not proceed at lower temperatures, and when esterification does take place at such lower temperatures, the reaction time requires is generally increased 3 to 5 mold. Further, the color of the product obtained at lower temperatures is generally less satisfactory. It is considered quite surprising that utilization of increased temperatures in accordance with this invention not only increases the rate of the esterification but also provides a superior product.

It is known that the presence of moisture interferes with esterification reaction. Accordingly, substantially anhydrous reactants, isopropanol, and reaction conditions (i.e. dry reaction vessels, anhydrous inert gases, etc.) are employed in the process of this invention. After esterification of the copolymer, the product is cooled and pressure in the reaction system is bled to atmospheric. The viscous product can then be diluted with ethanol or isopropanol, preferably ethanol, to facilitate its utilization in various well-known applications.

Example I

About 19.4 pounds of normal butanol and about 11.9 pounds of isopropanol are added to a dry reaction vessel fitted with a reflux condenser and stirrer. About 33.5 pounds of ethylene-maleic anhydride copolymer is added to the reaction vessel with stirring to form a slurry.

The reaction vessel is purged and pressurized with dry nitrogen. The system is heated to reflux the reaction mixture at a temperature of 100 to 105° C. at a pressure of 10 to 12 p.s.i.g. (The boiling point of the reaction mixture at atmospheric pressure is determined to be about 94 to 96° C.) Periodic analysis of the reaction mixture indicates the esterification to be substantially complete in about 3 hours.

The reaction mixture is cooled to ambient temperature and the pressure slowly bled to atmospheric.

The product is light yellow and exhibits a color of 2 Gardner units. Analysis of the product indicates that the ethylene-maleic anhydride copolymer is more than 97.5% by weight esterified. The esterified product is predominantly the n-butyl half ester with less than 10% by weight isopropyl ester. No odor of butanol is detected. The viscous product is easily dissolved in ethanol to form a 50% by weight solution.

The production of the normal butyl half ester as described illustrates the advantages of this invention since difficulty in handling the glassy solid product produced by conventional processes and the objectionable odor of normal butanol when any substantial amount of unreacted alcohol is present in the product exemplify problems hitherto encountered.

Example II

A dry reaction vessel fitted with a reflux condenser and stirrer is charged with about 31.5 pounds of ethylene maleic anhydride copolymer about 25.5 pounds of 2-hexanol, and about 11.5 pounds of isopropanol. With continuing agitation, the reaction vessel is purged and pressurized with nitrogen. The system is heated to 134° C., the resultant pressure being about 10 p.s.i.g.

Analysis indicates the esterification to be substantially complete in about three hours. The copolymer is 98% by weight esterified, the product being predominantly the 2-hexyl half ester with less than 5% by weight isopropyl ester. The viscous product exhibits a color of 3 Gardner units and is readily dissolved in ethanol to form a 50% by weight solution.

Examples III–IV

Various alcohols are reacted with ethylene maleic anhydride at elevated temperatures and pressures as shown in Table 1 below. The manipulation procedures used are identical to those described in Example I. All products are viscous liquids readily soluble in ethanol. Product assay is reported as weight percent of total esterified copolymer.

TABLE 1

| Example | Reactant alcohol | Molecular proportions reactant alcohol per maleic anhydride group | Molecular proportions isopropanol per maleic anhydride group | Pressurizing gas | Temperature, °C. | Time, hrs. | Pressures, p.s.i.g. | Percent by weight copolymer esterified | Product assay | Color Gardner3 units4 |
|---|---|---|---|---|---|---|---|---|---|---|
| III | 5-methyl-2-hexanol | 1 | 0.6 | $CO_2$ | 140 | 25 | 10 | 97.5 | 95% 5-methyl-2-hexyl half esters | |
| IV | 2-ethyl-1-hexanol | 0.8 | 0.5 | $N_2$ | 168 | 3 | 10 | 95.5 | 94% 2-ethyl hexyl half ester | |

Examples V–VIII

Various copolymers are esterified with reactant alcohols in the presence of isopropanol under conditions shown in Table 2. The reactions are conducted in a dry autoclave fitted with a stirrer and sealed after purging and pressurization with nitrogen. The systems are cooled and vented to atmospheric pressure at the end of the time indicated. All products are viscous liquids and assay is reported as in Examples III–IV.

TABLE 2

| Copolymer | Reactant alcohol | Molecular proportions reactant alcohol per maleic anhydride group | Molecular proportions isopropanol per maleic anhydride group | Temperature, °C. |
|---|---|---|---|---|
| Example: | | | | |
| V ........... Methyl vinyl ether maleic anhydride | 1-butanol | 1 | 1 | 130 |
| VI .......... 2-ethylene maleic anhydride | 5-methyl 2-hexanol | 1 | 1 | 170 |
| VII ......... Ethylene maleic anhydride | 2-methyl 2-ethyl-1-pentanol | 1 | 1.5 | 180 |
| VIII ........ do | 3 ethyl-2-hexanol | 1 | 1.2 | 175 |

| | Pressure, p.s.i.g. | Time, hrs. | Weight percent of copolymer esterified | Product assay | Product color, Gardner units |
|---|---|---|---|---|---|
| Example: | | | | | |
| V | 75 | 3 | 98.2 | 97% n-butyl half ester | 3 |
| VI | 330 | 2.8 | 96.7 | 96% 5-methyl 2-hexyl half ester | 4 |
| VII | 350 | 3.5 | 96.0 | 95% 2-methyl-2-ethyl pentyl half ester | 4 |
| VIII | 350 | 3.2 | 95.0 | 94% 3-ethyl 2-hexyl half ester | 4 |

Although the invention has been described by reference to specific embodiments various modifications within the scope of the claims will be apparent to those skilled in the art.

What is claimed is:

1. In a process of preparing alkyl half esters of maleic anhydride copolymers by reacting copolymers of maleic anhydride copolymers selected from the group consisting of copolymers of maleic anhydride with olefins containing from 2 to 4 carbon atoms and copolymers of maleic anhydride with alkyl vinyl ethers wherein the alkyl group contains from 1 to 3 carbon atoms with a reactant alcohol selected from the group consisting of linear primary alcohols containing 1 to 8 carbon atoms; primary alcohols containing 5 to 8 carbon atoms and having the formula

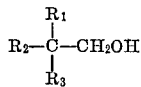

wherein $R_1$ and $R_2$ are selected from the group consisting of hydrogen and alkyl, $R_3$ is alkyl, $R_3$ being branched when both $R_1$ and $R_2$ are hydrogen, and at least two of $R_1$, $R_2$ and $R_3$ contain at least 2 carbon atoms when $R_1$, $R_2$ and $R_3$ are alkyl linear secondary alcohols having 6 to 8 carbon atoms; and secondary alcohols containing from 6 to 8 carbon atoms and having the formula

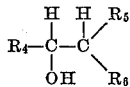

wherein $R_4$ is a linear alkyl group, $R_5$ is selected from the group consisting of hydrogen and ethyl, $R_6$ is a branched chain alkyl group when $R_5$ is hydrogen and is a linear alkyl group containing at least 2 carbon atoms when $R_5$ is ethyl, the improvement wherein the reaction mixture contains about 0.5 to 1.1 molecular proportions of alcohol per maleic anhydride group and the reaction is conducted in the presence of from about 0.5 to 2.0 molecular proportions of isopropanol per maleic anhydride group, under superatmospheric pressure at a temperature at least 2° C. above the atmospheric boiling point of the reaction mixture but below the temperature where substantial product degradation as evidenced by a product color darker than 5 Gardner units occurs.

2. The process of claim 1 wherein said temperature is at least about 100° C. and the reaction is conducted under an inert atmosphere.

3. The process of claim 2 wherein the reaction mixture contains about 1 molecular proportion of said reactant alcohol and about 1 molecular proportion of said isopropanol per maleic anhydride group.

4. The process of claim 1 wherein said reactant alcohol is a primary alcohol.

5. The process of claim 4 wherein said copolymer is an alkyl vinyl ether-maleic anhydride copolymer wherein the alkyl group contains from 1 to 3 carbon atoms.

6. The process of claim 3 wherein said copolymer is a methyl vinyl ether-maleic anhydride copolymer and said reactant alcohol is n-butyl alcohol.

7. The process of claim 4 wherein said copolymer is an ethylene-maleic anhydride copolymer.

8. The process of claim 7 wherein said reactant alcohol is n-butyl alcohol.

9. The process of claim 7 wherein said reactant alcohol is 2 ethyl-1-hexanol.

References Cited

UNITED STATES PATENTS 2,977,334   3/1961   Zopf et al. _____ 260—27

JOSEPH L. SCHOFER, Primary Examiner

J. KIGHT III, Assistant Examiner

PO-1050
(5/69)

UNITED STATES PATENT OFFICE
CERTIFICATE OF CORRECTION

Patent No. 3,530,101            Dated September 22, 1970

Inventor(s) Richard T. Haynes and Riley N. Weston

It is certified that error appears in the above-identified patent and that said Letters Patent are hereby corrected as shown below:

Column 3, line 38, the word "mold" should read -- fold --.
Column 4, under Table 1, line 60, last column, delete the numeral "3" after the word "ner"; line 61, last column, delete the numeral "4" after the word "units"; line 62, last column, insert numeral -- 3 --; line 63, last column, insert numeral -- 4 --.

Signed and sealed this 25th day of April 1972.

(SEAL)
Attest:

EDWARD M. FLETCHER, JR.
Attesting Officer

ROBERT GOTTSCHALK
Commissioner of Patents